(12) United States Patent
Son et al.

(10) Patent No.: US 7,836,474 B2
(45) Date of Patent: Nov. 16, 2010

(54) METHOD AND APPARATUS FOR PREPROCESSING AND POSTPROCESSING CONTENT IN AN INTERACTIVE INFORMATION DISTRIBUTION SYSTEM

(75) Inventors: Yong Ho Son, Palo Alto, CA (US); Christopher W. B. Goode, Menlo Park, CA (US)

(73) Assignee: Cox Communications, Inc., Atlanta, GA (US)

( * ) Notice: Subject to any disclaimer, the term of this patent is extended or adjusted under 35 U.S.C. 154(b) by 120 days.

(21) Appl. No.: 11/418,408

(22) Filed: May 4, 2006

(65) Prior Publication Data

US 2006/0218611 A1 Sep. 28, 2006

Related U.S. Application Data

(63) Continuation of application No. 09/772,288, filed on Jan. 29, 2001, now Pat. No. 7,159,233.

(60) Provisional application No. 60/178,795, filed on Jan. 28, 2000, provisional application No. 60/178,809, filed on Jan. 28, 2000, provisional application No. 60/178,810, filed on Jan. 28, 2000, provisional application No. 60/178,857, filed on Jan. 28, 2000.

(51) Int. Cl.
*H04N 7/173* (2006.01)
*G06F 15/16* (2006.01)

(52) U.S. Cl. ............................. 725/87; 725/91; 725/98; 709/218; 709/219; 709/231

(58) Field of Classification Search ............. 725/86–88, 725/91, 98, 114, 118, 119, 138, 144, 148, 725/149; 709/218, 219, 231
See application file for complete search history.

(56) References Cited

U.S. PATENT DOCUMENTS

| 5,838,678 | A | 11/1998 | Davis et al. |
| 5,856,973 | A | 1/1999 | Thompson |
| 5,898,456 | A | 4/1999 | Wahl |
| 6,079,566 | A | 6/2000 | Eleftheriadis et al. |
| 6,209,129 | B1 * | 3/2001 | Carr et al. ................... 725/42 |
| 6,253,375 | B1 | 7/2001 | Gordon et al. |
| 6,308,222 | B1 * | 10/2001 | Krueger et al. ............ 709/247 |

(Continued)

FOREIGN PATENT DOCUMENTS

EP 01 91 0365 5/2006

(Continued)

OTHER PUBLICATIONS

U.S. Appl. No. 09/772,287, filed Jan. 29, 2001, entitled "Method and Apparatus for Content Distribution VIA Non-Homogeneous Access Networks".

(Continued)

*Primary Examiner*—Joseph G Ustaris
(74) *Attorney, Agent, or Firm*—Merchant & Gould

(57) ABSTRACT

A method and apparatus for preprocessing and postprocessing content in an interactive information distribution system. Content is retrieved from a storage medium and encapsulated in accordance to an Internet Protocol (IP) format. The encapsulated content is then uploaded for storage in a stream caching server and for future streaming of content to different types of access networks.

20 Claims, 6 Drawing Sheets

U.S. PATENT DOCUMENTS

| | | | |
|---|---|---|---|
| 6,463,477 B1 * | 10/2002 | Fontenot | 709/236 |
| 6,477,550 B1 * | 11/2002 | Balasubramaniam et al. | 715/234 |
| 6,487,663 B1 * | 11/2002 | Jaisimha et al. | 713/193 |
| 6,546,555 B1 * | 4/2003 | Hjelsvold et al. | 725/1 |
| 6,557,031 B1 | 4/2003 | Mimura et al. | |
| 6,647,411 B2 | 11/2003 | Towell et al. | |
| 6,697,379 B1 * | 2/2004 | Jacquet et al. | 370/469 |
| 6,701,361 B1 * | 3/2004 | Meier | 709/224 |
| 6,848,002 B1 * | 1/2005 | Detlef | 709/231 |
| 7,089,579 B1 * | 8/2006 | Mao et al. | 725/109 |
| 2001/0013068 A1 | 8/2001 | Klemets et al. | |

FOREIGN PATENT DOCUMENTS

| | | |
|---|---|---|
| WO | WO 98/51080 A | 11/1998 |
| WO | WO 99/21363 A | 4/1999 |

OTHER PUBLICATIONS

Bonisch H et al: "Server side compresslets for Internet multimedia streams" Multimedia Computing and Systems, 1999, IEEE International Conference on Florence, Italy Jun. 7-11, 1999, Los Alamitos, CA, USA, IEEE Comput. Soc. US, vol. 2, Jun. 7, 1999, pp. 82-88, XP010519360 ISBN: 0-7695-0253-9.

* cited by examiner

METHOD AND APPARATUS FOR PREPROCESSING AND POSTPROCESSING CONTENT IN AN INTERACTIVE INFORMATION DISTRIBUTION SYSTEM

CROSS-REFERENCE TO RELATED APPLICATION

This application is a continuation of U.S. patent application Ser. No. 09/772,288, filed Jan. 29, 2001, now U.S. Pat. No. 7,159,233 which claims benefit of U.S. Provisional Patent Application Ser. Nos. 60/178,795, 60/178,809, 60/178,810 and 60/178,857, all filed on Jan. 28, 2000, and such applications are herein incorporated by reference in their entireties.

This invention is related to U.S. patent application Ser. No. 09/772,287, filed Jan. 29, 2001, and such application is herein incorporated by reference in its entirety.

BACKGROUND OF THE INVENTION

1. Field of the Invention

The invention relates to electronic storage and transmission of content. More particularly, the invention relates to a method and apparatus for preprocessing and postprocessing content in an interactive information distribution system.

2. Description of the Background Art

Information systems such as video on demand (VOD) systems are capable of streaming program content to a great number of users or subscribers. To provide a requested program content to a subscriber, the VOD system retrieves the requested program content from a video server, streams the content over a stream distribution network, and converts the content to an access network that is coupled to a particular neighborhood of subscriber terminals. The user then views the requested program content at the subscriber terminal.

However, the different types of access networks have different limitations with respect to transmission latency, bandwidth, and the like. To service a wide subscriber base, the VOD systems currently implement different solutions for each type of access network. For example, VOD systems that provide web-based video content must account for a public and private wide area networks that support content of a particular quality of service (QoS), typically medium latency, low bandwidth and poor quality video, e.g. high jitter. Additionally, VOD systems that provide cable-based video must account for cable networks that support low latency, high bandwidth and high quality video.

One example of using different solutions involves the use of separate video servers for each type of access network. Such a solution only increases the cost of providing program content at the head end. Therefore, there is a need in the art to provide a scalable VOD solution that is common for the different types of access networks. Additionally, there is a need to preprocess and postprocess content for such a VOD solution.

SUMMARY OF THE INVENTION

The invention provides a method and system for preprocessing content for a stream caching server in an interactive information distribution system. In one embodiment, the method initially retrieves of content in a subscriber terminal. The retrieved content is encapsulated in accordance to an Internet Protocol (IP) format used for streaming content to various access networks. The encapsulated content is then uploaded for storage in a stream caching server and for future streaming of content to different types of access networks.

The present invention preprocesses content into a common format suitable for a stream caching server capable of transmitting content to different types of access networks. In one embodiment of the invention, a user executes an applet program to preprocess content stored in a computer terminal. Such a configuration enables a user to upload content over the Internet for storage in a stream caching server and subsequent streaming to other subscribers. The invention also postprocesses content into a format supported by a particular type of player and access network used to receive the content from the stream caching server.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
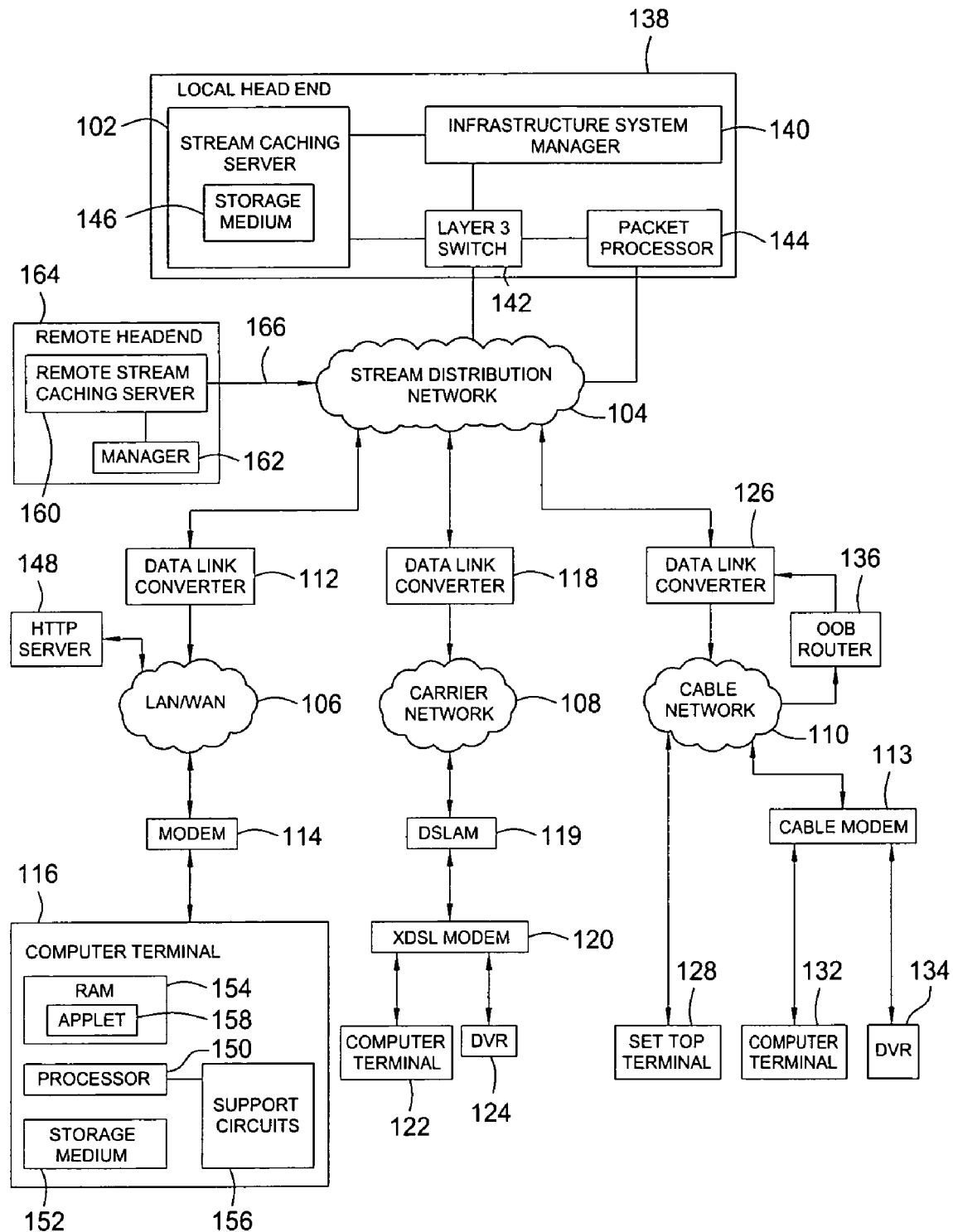
FIG. 1 depicts a high level block diagram of a first portion of an interactive information distribution system embodied in the present invention.

FIG. 1 depicts a high level block diagram of an interactive information distribution system 100. One application of the distribution system 100 is as a video on demand (VOD) system, as described in U.S. Pat. No. 6,253,375 and incorporated herein by reference. In such a VOD system 100, a user may request and receive a particular content selection, e.g., video, movie or programming content, from a service provider without any time restrictions associated with normal cable programming.

The information distribution system 100 comprises a stream caching server 102, a stream distribution network 104, at least one access network and at least one subscriber terminal. The stream caching server 102 receives, stores and streams content in accordance to an Internet Protocol (IP). One example of such a stream caching server 102 is disclosed in simultaneously filed U.S. application Ser. No. 09/772,287, entitled "Method and Apparatus for Streaming Content in an Interactive Information Distribution System," which is herein incorporated by reference. The content is configured within a payload portion of each IP packet received, stored and streamed by the stream caching server 102. The use of this IP formatted content enables a single stream caching server 102 to stream content via an integrated stream distribution network 104 to different types of access networks. As such, the system 100 is capable of streaming the same content to any cable service subscriber or any person using the Internet.

In accordance to the present invention, the stream caching server 102 may receive content that is preprocessed at, for example, a remotely located subscriber terminal. One such subscriber terminal is a computer terminal 116 comprising a processor 150, a storage medium 152, a random access memory (RAM) 154 and support circuits 156. The RAM 154 stores an applet 154 that is downloaded from, for example, a HTTP server 148 coupled to an access network, for example, a private local area network (LAN) or wide area network (WAN) 106. The processor 150 executes the applet 154 to initiate the preprocessing in the present invention. The storage medium 152 stores the content to be preprocessed. The support circuits 156 provide an interface for receiving the applet 154 from the http server 148, receiving content from the streaming cache server 102, or uploading preprocessed content to the http server 148.

Possible configurations of the applet 154 include a JAVA Applet Plug In for an Internet browser, or a software program written in a particular programming language, e.g., C++. Once the processor 150 executes the applet 154, the content is retrieved from the storage medium 152. The content may include standard multimedia files in a variety of formats, e.g., AVI (Audio Video Interleaved), Moving JPEG, MPEG-1, MPEG-2, MPEG-4, MP3, Quicktime, and the like. If a need exists to convert the content into a particular format, the retrieved content may be transcoded into a format supported by a viewer or subscriber terminal that eventually receives the downstream content. The transcoding of content changes the format and rate of the retrieved content. One example of such transcoding is the conversion of MPEG-2 content into MPEG-4 content that can be played on a graphic processor in set top terminals or personal computer (PC) terminals. Other types of content may be transcoded into MPEG-2 content playable on conventional set top terminals. Some transcoding requires decoding to baseband followed by encoding according to the desired format. Some transcoding may be performed without baseband decoding.

Figure 2A:
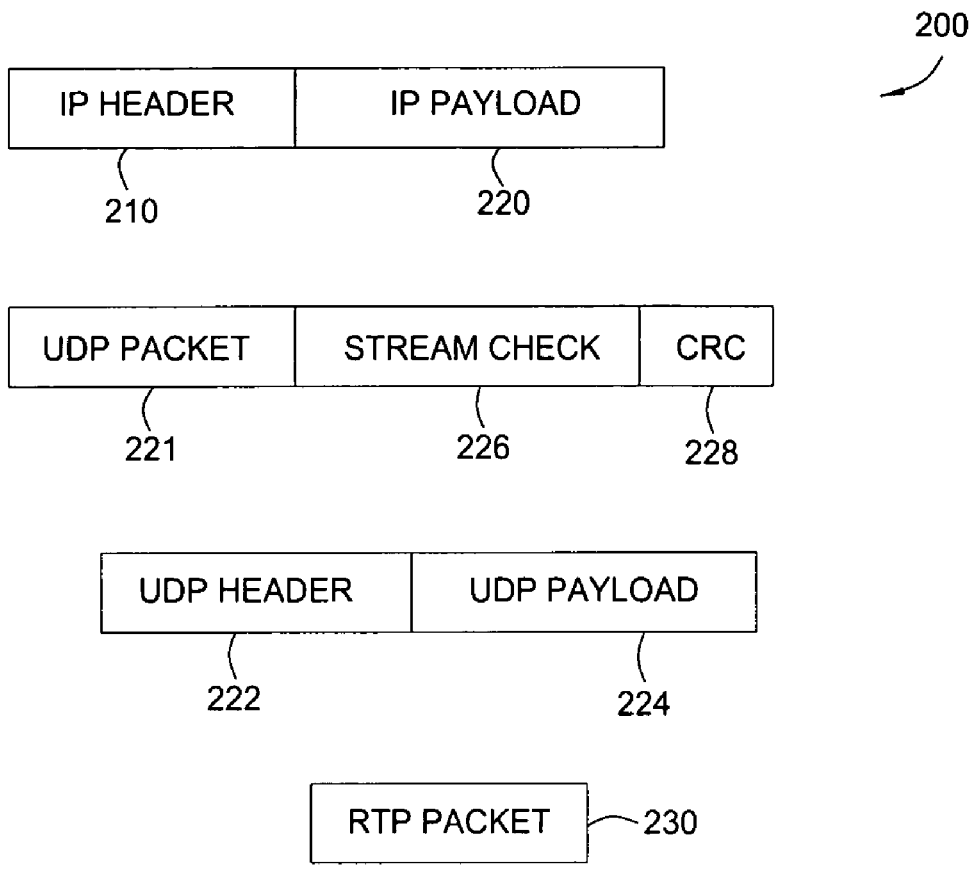
FIG. 2A depicts one embodiment of an Internet Protocol (IP) packet used in the information distribution system of FIG. 1.
Figure 2B:
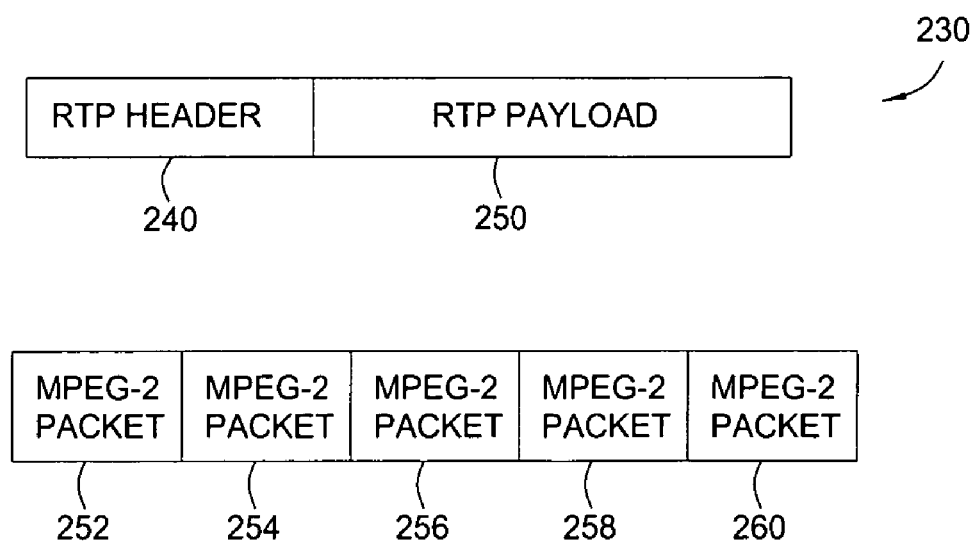
FIG. 2B depicts one embodiment of a Realtime Transport Packet (RTP) contained in a payload section of the IP packet of FIG. 2A.

The content, whether transcoded or not, is then encapsulated into a format that is optimal for the stream caching server 102. In one embodiment, the content, as MPEG-2 packets, is encapsulated in a payload of each Realtime Transfer Protocol (RTP) packet contained in the payload of an IP packet. The format of such encapsulated content is shown in FIGS. 2A-2B. However, the use of the RTP packet also supports non real time applications.

FIG. 2A depicts one embodiment of an Internet Protocol (IP) packet 200 used in the present invention. The IP packet 200 comprises an IP header 210 and an IP payload 220. The IP payload 220 comprises a UDP (User Datagram Protocol) packet 221 comprising a UDP header 222 and a UDP payload 224. A RTP packet 230, a stream integrity check field 226 and a cyclic redundancy check (CRC) field 228 are illustratively contained in the UDP payload 224. In one embodiment of the IP packet 200, the IP header 210 is 20 bytes, the UDP header 222 is 8 bytes, the stream integrity check field 226 is 4 bytes and the CRC field 228 is 4 bytes.

FIG. 2B depicts one embodiment of a Realtime Transport Packet (RTP) 230 contained in a payload section 220 of the IP packet 300 of FIG. 2A. The RTP packet 230 comprises a RTP header 240 and a RTP payload 250. Five MPEG-2 packets 252, 254, 256, 258, and 260 are illustratively contained in each RTP payload 250. The number of MPEG-2 packets in the RTP payload 250 corresponds to the buffer space in the Fibre Channel controller in the packet processor 144.

For the embodiment shown in FIGS. 2A-2B, the transcoding may also include compression of the IP header 210, the UDP header 222, and the RTP header 240. The compression of these headers 210, 222, and 240 optimizes the storage of content on the storage medium 146 of the stream caching server 102. Additionally, the transcoding may include encryption of the content.

Compression of the IP header 210 may include compression of non-address fields, and deletion of source and destination IP addresses. The IP source address is subsequently decompressed (at the packet processor 144) as the IP address at the output interface of the stream caching server 102. The IP destination address is assigned prior to streaming and is based upon the data link converter 112, 118 or 126 or edge device for the target access network 106, 108 or 110.

The compression of the UDP header 222 may delete source and destination port numbers in the storage medium 146. New values are then assigned to the source and destination port numbers prior to streaming of content over the stream distribution network 104. The source port number is assigned a unique stream number with IP addresses. The destination port number is assigned a unique target stream number within the data link converter 112, 118 or 126 or the target edge device.

Once encapsulated into the IP format, the content is then uploaded to the http server 148 via the modem 114 and the LAN/WAN 106. The HTTP server 148 provides a user interface, e.g., a HTML (HyperText Markup Language) page, for the user to upload the content to the stream caching server 102. The http server 148 also transmits the transcoded content upstream to the data link converter 112 via the LAN/WAN 106. The data link converter 112 modulates the encapsulated content for upstream transmission over the distribution network 104 for storage in the stream caching server 102.

The preprocessing of the present invention is not limited to a computer terminal 116 uploading content over a LAN/WAN 106. For example, the encapsulation may also occur in the computer terminal 116 prior to uploading to content to the http server 148. Additionally, the preprocessing may be initiated from a computer terminal 122 or digital video recorder 124 over a carrier network 108, e.g., a T-1 or T-3 line. As such, a user of any computer terminal 116 and 122 may author multimedia content over a network, e.g., Internet, and store the content in a virtual video shelf at the stream caching server 102 for playback by other users. The preprocessing is also applicable to content from a content provider such as a movie manufacturer.

The preprocessing may also include the creation of metadata once the processor 150 executes the applet 154. The metadata generally contains a variety of information about the content to be stored on the stream caching server 102 and streamed to a viewer or subscriber terminal. One embodiment of the metadata is in the form of a data structure that is prepended prior to a file associated with the content.

The metadata may comprise many different types of information used by the stream caching server 102 in steaming the content to a viewer device or subscriber terminal. One type of metadata that identify the content include title, author, screenwriter, actors, length of play, timing information, play rate, e.g., constant bit rate (CBR) or variable bit rate (VBR), genre of content, size of content, and the like. Other forms of metadata indicate the type of content and the type of player used to play the content. Illustrative types of content include AVI, MPEG-1, MPEG-2, MPEG-4, MP3, Quicktime, and Moving JPEG. The metadata may also include MPEG7 structure including scene descriptions and indices. Exemplary types of player devices include MPEG-1 player, MPEG-2 player, MPEG-4 player, Microsoft Media Player, Real Video/Real Audio Player, and QuickTime Player.

The metadata may include pricing information and restrictions to view the content from the server 102. A user or service provider may preset the price and access restrictions that are required to view the preprocessed content from the server 102. Pricing information include a price to view the content, applicable discounts associated with viewing the content, and applicable package deals when ordering the preprocessed content with other content selections. Access restrictions include rating of content, viewing window information and sales window information. The viewing window is a graphical interface that requires a subscriber to enter a correct password to receive the content from the server 102. The sales window is a graphical interface that requires a subscriber to pay for viewing a particular content selection.

The metadata comprises indexing at IP packet boundaries, e.g., Group of Pictures (GOP) boundaries and frame boundaries. This indexing enables the stream caching server 102 in responding to an interactive VCR like commands, e.g., fast forward (FF), rewind (REW), pause, stop, bookmark, and return to place. Specifically, the indexing information supports random frame access at a content stream granularity, separate FF and REW tracks, random frame access of FF and REW tracks, pause/play, bookmarks for each active subscriber, and DVD scene selection. Additionally, the metadata may also include markers for changes in variable bit rate (VBR) and statistical multiplexing.

The indexing enables the use of MPEG-7 based descriptors for indexed access of content. The indexing of content can be on a per frame basis or a per GOP basis. MPEG-7 based descriptors include a length of descriptor, i.e., from a start frame to an end frame, and a schema for a database of indices. The database is a hierarchical based database that allows for hierarchical scene description. For example, a root index may represent a scene of Paris, while a branch index may represent a scene of the Eiffel Tower.

The indexing is also used for stream creation. In one embodiment, the stream is created in realtime from a single MPEG-2 or MPEG-4 content stream, e.g., a start GOP to an end GOP, or a start frame to an end frame. In a second embodiment, the stream is created in non real time and the modified stream file is stored. In a third embodiment, the stream is transcoded or re-encoded such that a reference frame or I-frame is forced to be the frame with information desired in an index, even if the frame arrived in the packet processor 144 as a predictive frame, e.g., B-frame or P-frame. Stream indexing will also be discussed below with respect to FIG. 3.

Once the preprocessed content is uploaded, the stream caching server 102 may store and stream the preprocessed content, or alternatively stream the content in real time. The streaming of content encapsulated in IP format enables the stream caching server 102 to stream content to subscribers via different types of access networks 106, 108 and 110. As such, only one stream caching server 102 and one distribution network 104 is required to provide scalable streaming. Namely, one stream caching server 102 may stream content to the LAN/WAN 106, the carrier network 108, the cable network 110 and any other access network that supports IP. This greatly reduces the hardware cost at the head end 138, as the prior art requires a streaming caching server 102 and a distribution network 104 for each type of access network 106, 108 and 110.

For example, the server 102 may stream content to a private Local Area Network (LAN) or Wide Area Network (WAN) 106. Specifically, the system 100 may stream content through the stream distribution network 104 to a digital link converter 112, the LAN or WAN 106, a modem 114 and a display device coupled to a computer terminal 116. If a user decides to request content from the server 102 or uplink content, e.g., a home movie, to the server 102, that request or content would travel upstream in a path reverse to that of the downstreamed content. The digital link converter 112 modulates the program content for transmission via the private LAN/WAN 106. Additionally, the data link converter 112 extracts a MPEG formatted program content from the RTP formatted stream from the stream distribution network 104 and transcodes the program content into a format that is supported by the LAN/WAN 106. One example of the data link converter 112 is a DIVA Digital Link (DDL 500) that performs quadrature amplitude modulation (QAM) on the downstream program content. The LAN or WAN 106 is a private network provided by a private party or an Internet Service Provider (ISP). The modem 114 demodulates video content for viewing on the computer terminal 116.

The server 102 may also stream content via the stream distribution network 104 to a data link converter 118, a carrier network 108, a digital subscriber line access multiplexer (DSLAM) 119, an x-DSL modem 120 to either a computer terminal 122 or a digital video recorder (DVR) 124. A request for content or upload of content would travel in the reverse path taken by the downstream content. The carrier network 108 may include a T-1 or T-3 transmission link. The data link converter 118 multiplexes the downstream content for transmission via the carrier network 108. Additionally, the data link converter 118 may extract MPEG packets from the IP formatted stream from the stream distribution network 104. The DSLAM 119 demultiplexes the downstream content to a particular xDSL modem 120. The xDSL modem 120 demodulates the content for viewing on a computer terminal 122 or a display device (not shown) coupled to the DVR 124. The xDSL modem 120 may comprise a ADSL (asynchronous digital subscriber line) modem, a VDSL (very high data rate digital subscriber line), and the like.

The server 100 may also stream content (or program content selection) via the stream distribution network 104 to a data link converter 126, the cable network 110 to either a set top terminal 128 or a cable modem that is coupled to a computer terminal 130 or a DVR 132. The data link converter 126 operates in a similar manner to the digital link converter 112 except to format the content for transmission in the cable network 110. The content is transmitted from the cable network 110 to a set top terminal 128 or a cable modem 130 that demodulates the program content for viewing on a computer terminal 132 or a display device coupled to the DVR 134. A request from a cable subscriber or user is processed via the cable network 110, the OOB (out of band) router 136 and the modulator 126 that modulates the request back to the stream distribution network 104.

Although the system 100 is illustratively shown to stream program content to the LAN/WAN 106, the PSTN 108 and the cable network 110, the system 100 may also stream content to other types of access networks. For example, the system 100 may also stream program content to satellite and terrestrial networks. Additionally, each system 100 actually streams content over many more access networks and subscriber terminals than the example shown in FIG. 1.

The stream caching server 102 is located at the local head end 138 with an infrastructure system manager 140, a switch 142 and a packet processor 144. The stream caching server 102 comprises a storage medium 146 to store the content preprocessed in accordance to the present invention. One configuration of the storage medium 146 is a redundant set of disk arrays, e.g., Redundant Array of Inexpensive Disks (RAID).

The infrastructure system manager 140 coordinates a (user) request from the subscriber terminal by passing the request to the stream caching server 102 and establishing a session between the subscriber terminal and the stream caching server 102. An exemplary infrastructure system manager 140 is the DIVA System Manager (DSM) as disclosed in U.S. application Ser. No. 09/772,287. The switch 142 routes the user request from the stream distribution network 104 to the system manager 140. Additionally, the switch 142 routes the retrieved content from the stream caching server 102 to the packet processor 144.

The storage medium 148 stores the preprocessed content in an IP format. The content is configured as a plurality of MPEG, e.g., MPEG-2 or MPEG-4, packets contained in a payload of a RTP packet within an IP packet. For example, the payload of each RTP packet may contain five MPEG-2 packets. The structure of the IP packet is shown in FIG. 2B. The RTP format (RFC 1889) minimizes the latency in streaming content from the server, by supporting the streaming of content in real time. Additionally, the content in the IP packet can be configured to have a minimal Quality of Service (QoS), e.g., data latency.

The packet processor 144 postprocesses the content into a format supported by a particular type of player and access network 106, 108 and 110 used to receive the content from the stream caching server 102. Such a player is either a software module downloaded from a HTTP server 148 to a computer terminal 122, a hardware module coupled to a subscriber terminal, or a card inserted into a subscriber terminal. Exemplary players include a MPEG-1 player, a MPEG-2 player, a MPEG-4 player, a Microsoft Media Player, a Real Video/Real Audio Player, a QuickTime Player, a Wireless Device Video or Audio Player, and the like.

The packet processor 144 transcodes the content without disturbing the IP format. For example, the packet processor 144 separates the content, e.g., MPEG-2 packets, and header information in the IP packet, transcodes the content packets into a desired format supported by the access network and downstream player, and combines the transcoded packets with the header information to recreate the IP packet. Such transcoding is performed at an elementary packet level for transmitting at the transport packet level. Additional functions performed by the packet processor 144 include jitter correction, creating of a PES (packet elementary stream), stream splicing, and statistical multiplexing.

More specifically, the transcoding includes the conversion of the content in the RTP payload into a format suitable for the access network 106, 108 and 110, but the transcoded content is still encapsulated in the IP packet stream. Such transcoding may change the format and rate of the content. For example, the transcoding may include the conversion of MPEG-2 formatted content into MPEG-1, MPEG-4, AVI, Moving JPEG, MP3, Quicktime, Wireless Applications Protocol content, and the like. The transcoding is performed in accordance with an extended Real Time Streaming Protocol (RTSP-RFC 2326) such that stream manipulations conform to Internet standards and are applicable to any access networks that support IP.

Additionally, the exact manner of the transcoding depends on the available bandwidth in the access network used to receive the content at the player. For example, the packet processor 144 may perform statistical multiplexing to dynamically allocate the amount of available bandwidth for streaming content to a particular viewer. To perform such statistical multiplexing, the packet processor 144 may stream content at either a constant bit rates or variable bit rates.

The transcoding is also adjustable to bandwidth degradations. To process lossy video, the transcoding may include lossy filtering within frames of content, dropping frames of content, e.g., resulting in a playback rate of 30 frames per second to 15 frames per second, and delivering still frames that contain important information. For non-lossy compression, the transcoding may include dropping MPEG null packets, and transcoding or re-encoding content to an acceptable quality.

The packet processor 144 may automatically perform such transcoding, or perform transcoding in accordance to user configured preferences. These preferences may include choices for a particular player, e.g., formatting, play rates, and type of conversion or transcoding. For example, if the player is embodied in software in a PC, then the content is transcoded into MPEG-2 format. However, if the player is a hand held device, then the content is transcoded into JPEG or MPEG-4 format. Additionally, the transcoding may be dynamically performed based on a user preference profile. Such a profile is based either on history or a default preference. For example, if the player is in the PC, the packet processor 144 transcodes the content into MPEG-2 at 4 Mbps and a constant bit rate.

The content in the payload of each RTP packet is sized to minimize the latencies in streaming content from the stream caching server 102 to the distribution network 104. The read block for the packet processor 144 is sized to the MPEG packets in the payload of each RTP packet. The number of MPEG packets in each RTP packet is constrained by an available buffer space in a Fibre Channel controller that is used to read the content.

The content streamed by the stream caching server 102 is not limited to content previously stored in the storage medium 148. In one embodiment, the stream caching server 102 streams content from another remotely located server, i.e., a server located at a remote head end. Such a configuration is further described with respect to FIG. 2.

The manager 140 provides session management for streaming content in accordance to the RTP Control Protocol (RTCP). Such management is particularly important in the case of content streamed to the local stream caching server 102 from the remote server. If any errors occurred during the streaming from the remote server, these errors are multiplied when the cached or stored content is then streamed to the many subscribers. RTCP enables the detection and transmission of only the read blocks affected by the streaming errors.

In another embodiment of FIG. 1, a portion of the system 100 comprises the stream caching server 102 and the infrastructure system manager 140 at the local head end 138, as well as a remote stream caching server 160 and an infrastructure system manager 162 at a remote head end 164, and a backbone streaming network 166. The stream caching server 160 and the infrastructure system manager 162 at the remote head end 164 operates in a similar manner to the respective stream caching server 102 and the infrastructure system manager 140 at the local head end 138 that were previously described.

The local infrastructure system manager 140 receives a request for a particular content selection and determines whether a user requested content selection is stored in the storage medium 148. If the request content is not in the storage medium 148, the local infrastructure system manager 140 identifies a remote stream caching server 160 that stores the requested program content and provides a (server) request to the remote system manager 162. For example, a local system manager 140 in San Francisco may request content from another remote remotely located server 160 in Boston.

In response to this server request, the local system manager 140 coordinates the streaming remote stream caching server 160 streams the requested program content over the backbone streaming network 166 to the local stream caching server 102. The content is then streamed to the subscriber. If the local system manager 140 determines that there are enough user requests above some predetermined threshold number, then the content from the remote stream caching server 160 is also stored in the local stream caching server 102.

Figure 4:
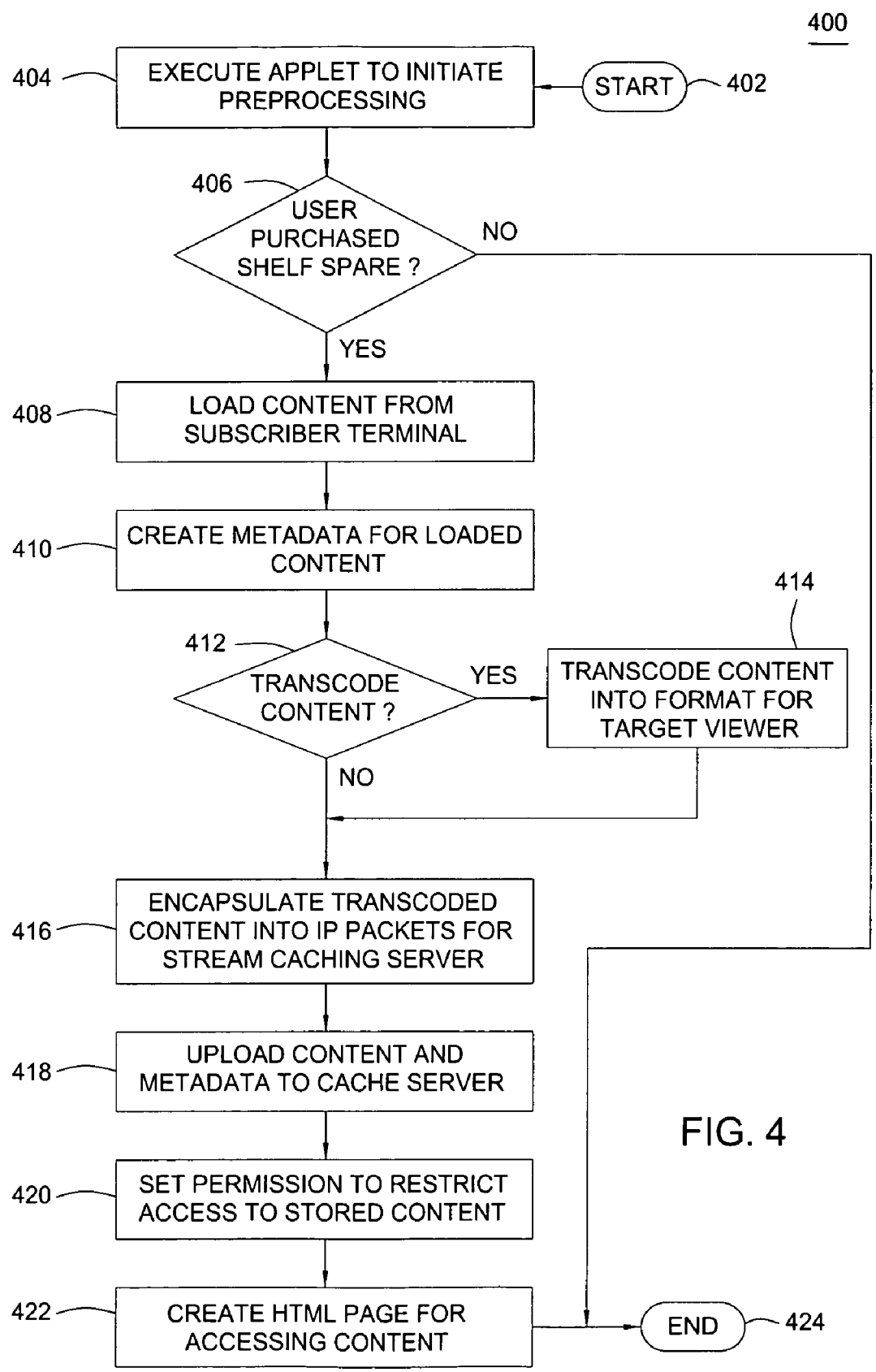
FIG. 4 depicts a flow diagram of a method for implementing the preprocessing of program content in accordance to one embodiment of the present invention.

FIG. 4 depicts a flow diagram of a method 400 for implementing the preprocessing of content e.g., a video program, in accordance to one embodiment of the present invention. The method 400 assumes that a user or subscriber has already downloaded an applet 154 from a http server 115. Specifically, the method 400 starts at step 402 and proceeds to step 404 where preprocessing is initiated when the applet 154 is executed by the processor 150 in the computer terminal 116. At step 406, a query determines whether a user has purchased shelf space. Namely, step 406 determines whether the user has purchased storage space or use of a portion of the storage medium 146 at the stream caching server 102. Step 406 may also cover situations where a user has access to shelf space.

If the user has not purchased shelf space on the storage medium 148, the method 400 proceeds to end at step 424. If the user has already purchased shelf space on the storage medium 148, the method 400 proceeds to step 408, where content is loaded from a memory 152 of the computer terminal 116. The content may comprise any multimedia presentation, e.g., a home made move, created by the user.

At step 410, the method creates metadata for the loaded content. The metadata contains indexing information that enables the stream caching server 102 to respond to user interactivity commands within a group of pictures or approximately one half a second. Examples of user interactivity commands include fast forward (FF), rewind (REW), pause, stop, bookmark and return to place. Additionally, the metadata includes information that enables the stream caching server 102 to determine the type of file and the resolution of the content.

The method 400 proceeds to step 412 where a query determines whether to transcode content. If no transcoding is required, the method 400 proceeds to step 416.

If transcoding is required, the method 400 proceeds to step 414 where the content is transcoded into a format that is supported by a viewer used to view downstream content. Step 414 may convert both the format and bit rate of the program content. In one embodiment, the content may be transcoded (at a elementary stream level) from MPEG-1, MP3, AVI, QuickTime or Moving formed into MPEG-2 formatted packets. At step 416, the method 400 encapsulates the transcoded content, e.g., MPEG-2 format, into an IP packet format (at the transport stream level). As previously described with respect to FIGS. 2A and 2B, storage of content in this IP packet format minimizes the retrieval time when the stored content is retrieved from the storage medium 146 and streamed to the distribution network 104.

The method 400 proceeds to step 418, where the transcoded content and metadata is uploaded from the computer terminal 116 and into the storage medium 148 of the stream caching server 102. Once the transcoded content is stored at the stream caching server 102, the method 400 enables the user (sender of the content) to establish or set permissions at step 420. This step establishes a subset of users who may access the content from the stream caching server 102. The method 400 proceeds to step 422, where a HTML page is established at the http server 115 for access by other users. The method 400 ends a step 424.

Figure 5A:
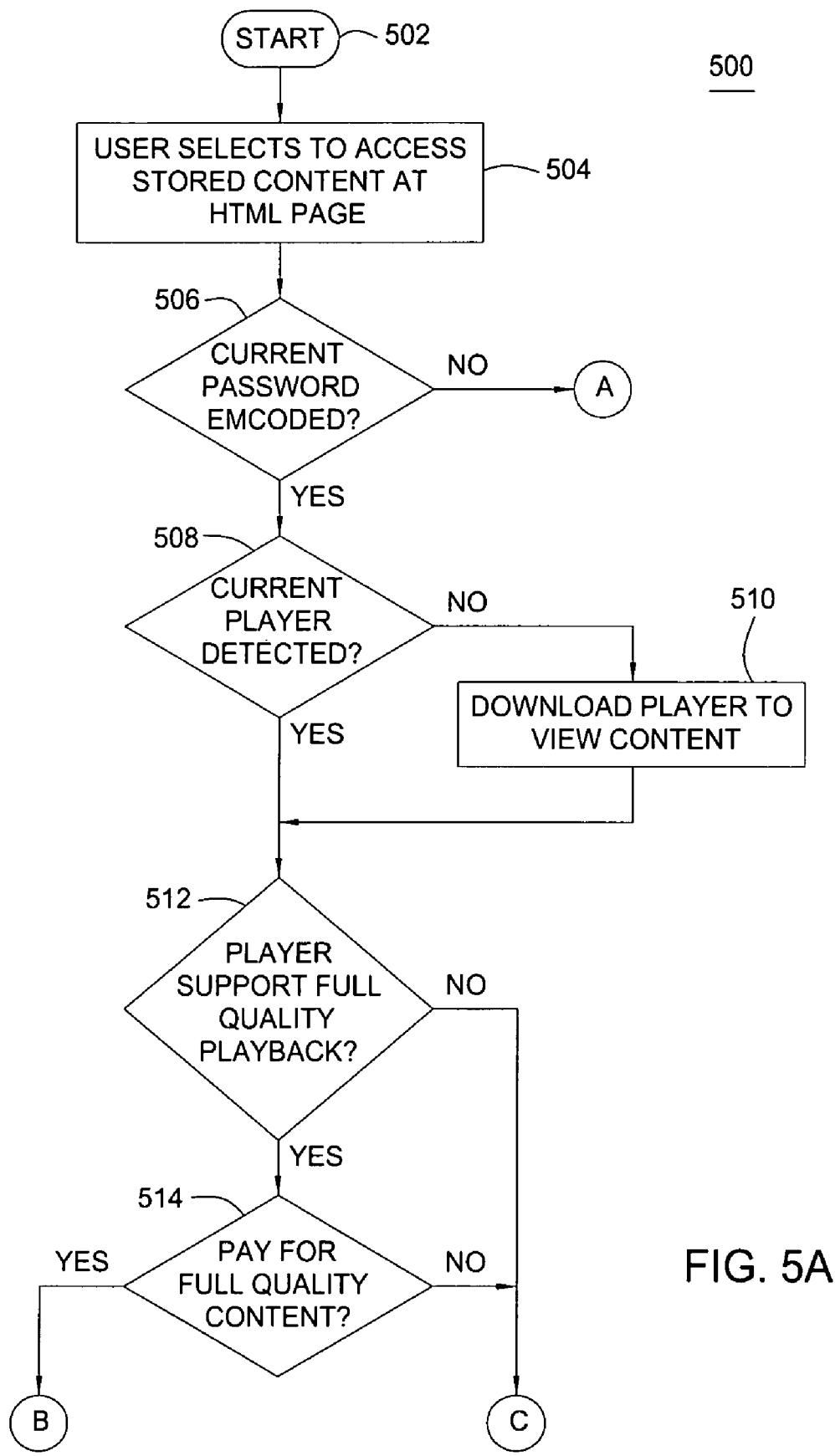
FIG. 5 depicts a flow diagram of a method for and postprocessing content in accordance to another embodiment of the present invention.
Figure 5B:
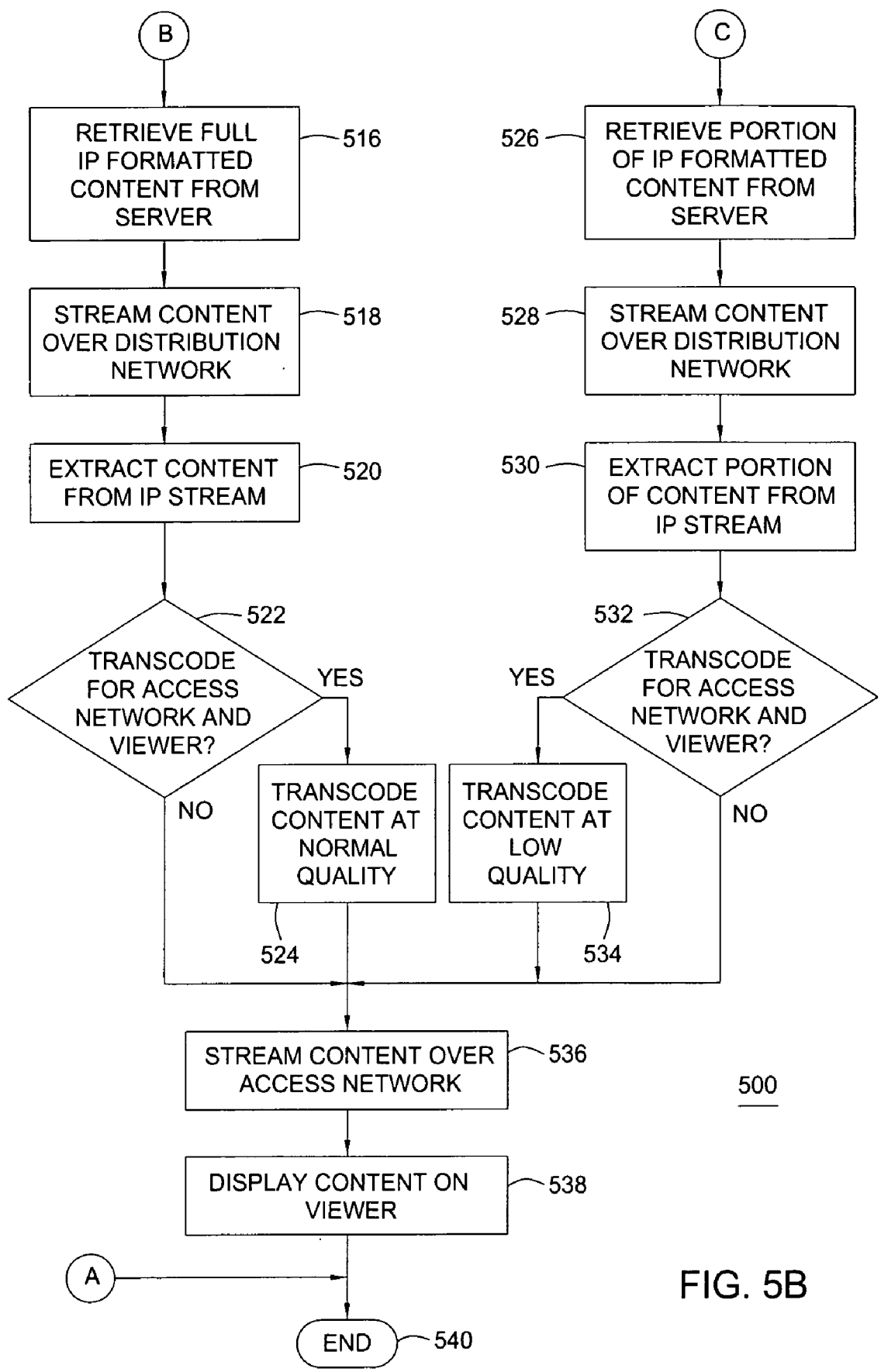

FIGS. 5A and 5B depict a flow diagram of a method for accessing program content that was preprocessed and stored at the stream caching server 102. In one embodiment of the method 500, a user may access the full version of the program content only after correctly entering the password and paying to view the content.

The method 500 starts at step 502 and proceeds to step 504, where a user access a html page and selects a particular program content to be played from the stream caching server. At step 506, the method 500 queries whether the user has entered the correct password as previously established by the owner of the program content. Step 506 may alternatively query for a particular subscriber name or keyword.

If the correct password is not entered, the method 500 ends at step 540. If the correct password is entered, the method 500 proceeds to step 508, where a query determines whether the user has a viewer or player to view the selected program content. Namely, step 508 determines whether a correct type of viewer or player is detected at the subscriber terminal, e.g., a computer terminal 116, 122 or 132. If the correct player is not detected, the method 500 proceeds to download the player at 510 and then proceeds to step 512. If the correct player is detected, the method 500 proceeds directly to step 512.

At step 512, a query determines whether the downloaded player supports playback (of content) at full quality. If the player does not support playing of content at full quality, the method 500 proceeds to step 526. If the player supports playing of content at full quality, the method 500 proceeds to step 514, where a query determines whether the user has paid to view a full quality version of the content, e.g., a program content file. If the user has paid to view the full quality version of the program content, the method 500 proceeds to retrieve the full IP formatted content from the stream caching server 102 at step 516 and streams the retrieved content over the distribution network 104 at step 518. The method 500 proceeds to step 520, where the data link converter 112, 118 or 126 extracts the content (at the transport level) from the IP packets, content or MPEG-2 packets from the IP formatted content. At step 522, a query determines whether to transcode the extracted content. Such transcoding is required to satisfy constraints in (downstream) transmitting the content over the access network 106, 108 and 110, and for playing the content on the viewer. If transcoding is not required, the method 400 proceeds to step 536. If transcoding is required, the method 500 transcodes the content at normal quality at step 524 and proceeds to step 536.

Referring back at step 514, if the user has not fully paid to view the full quality version of the content, the method 500 proceeds to step 526. At this step 526, the method 500 proceeds to retrieve a sample or predefined portion of the IP formatted content (file) from the stream caching server 102 at step 526. The method 500 then proceeds to stream the retrieved portion over the distribution network 104 at step 528, and extract the content, e.g., MPEG-2 packets, from the IP formatted content at step 530. The method 500 proceeds to step 532, where a query determines whether to transcode the extracted content for transmission over the access network 106, 108 or 110 and for playback on the viewer or player. If no transcoding is required, the method 500 proceeds to step 536. If transcoding is required, the method 500 proceeds to transcode the partial content at low quality at step 534 and then proceeds to step 536.

At step 536, the method 500 sends the transcoded content the subscriber terminal, e.g. a computer terminal 116, 122 and 132 via the access network 106, 108 and 110. The method 500 proceeds to play either the full or partial quality content at step 538 and ends at step 540.

Figure 3:
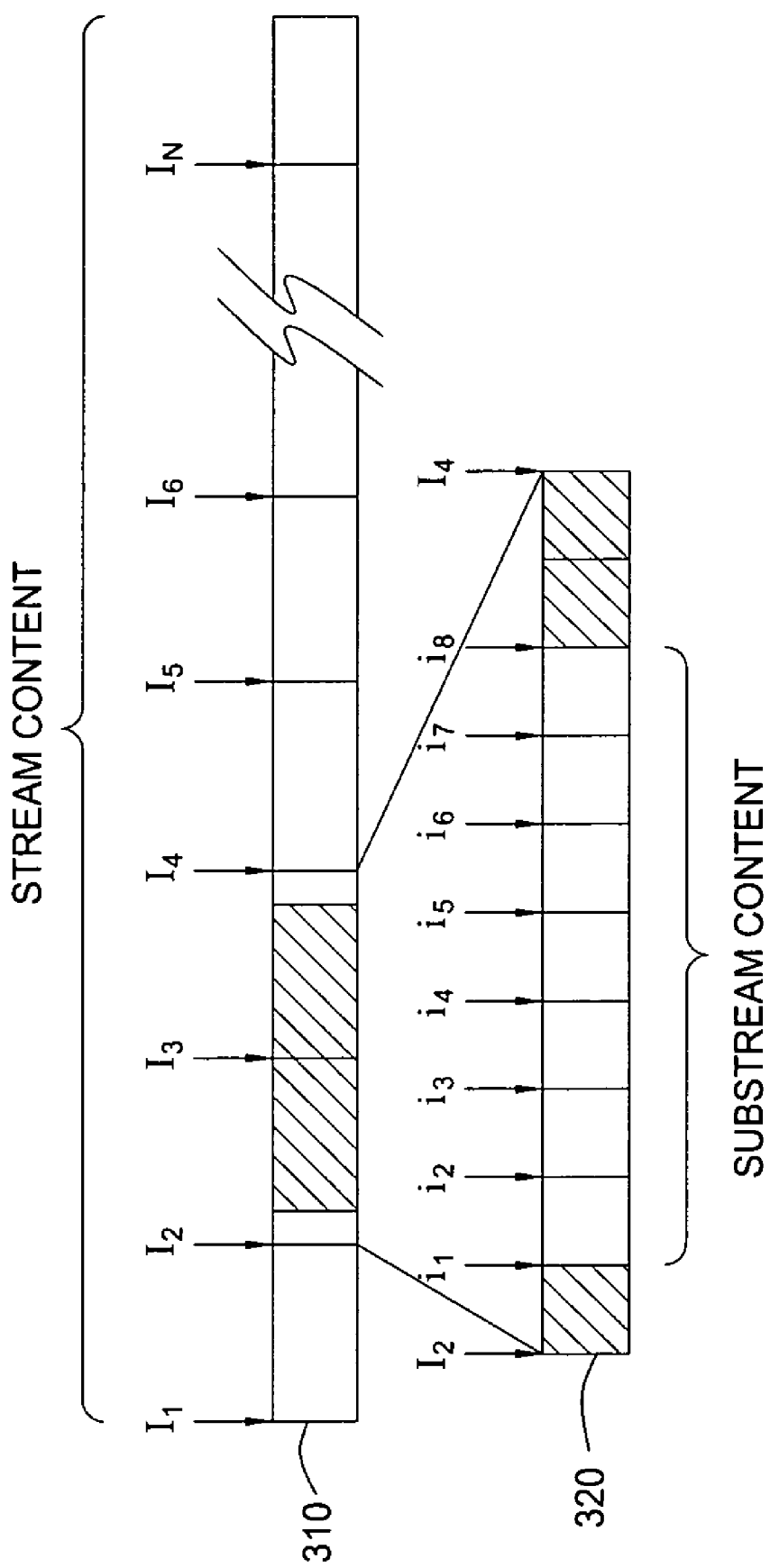
FIG. 3 depicts a data structure useful in understanding an embodiment of the present invention.

FIG. 3 depicts a data structure useful in understanding an embodiment of the present invention. Specifically, FIG. 3 depicts a content stream 310 including a plurality of index points denoted as $I_1$, $I_2$ and so on up to $I_N$ (collectively index points I). It will be appreciated that while the index points $I_1$ through $I_N$ are depicted as being spaced in an approximately even manner, there is absolutely no requirement for such equal spacing of the indices. Each index point represents an appropriate stream entry point beginning with, for example, an I-frame in the case of an MPEG content stream. Each indexed portion may be long or short, may comprise for example an entire scene or a plurality of scenes, other index divisions may be used.

FIG. 3 also depicts a sub-stream 320 comprising a plurality of index points denoted as $i_1$, $i_2$ and so on up to $i_8$. For purposes of this discussion, it is assumed that the sub-stream comprises portions of content between index point $I_2$ and index point $I_4$, yet not portions of the content traversing those index boundaries. The shaded portion of content stream 310 depicts the content within the sub-stream. The shaded portions of the sub-stream 320 depict content that is not included within the sub-stream. It is noted that the sub-stream may be stored as a separate entity along with the content stream 310. The sub-stream may comprise those image frames associated with a portion of content indexed according to the MPEG-7 standards. For example, in the case of a movie having a plurality of scenes, where objects within the scenes of the movie have been indexed according to the MPEG-7 format, a particular object (e.g., a sunset, classic automobile or actor) may be associated with an object or a group of objects represented within the content stream 310. Thus, the sub-stream 320 stores content specifically associated with a desired object so that such content may be retrieved.

It is noted that in retrieving a sub-stream it is desirable for the first frame, for example an MPEG-2 stream, to comprise an intra-coded frame (an I-frame). As such, since it is possible for the desired content to be included in the content stream 310 at a point comprising a non I-frame, the sub-stream 320, when created, includes transcoding of at least the first frame within the sub-stream into an intra-frame coding format. Additionally, if desired, each of the index points within the sub-stream may be reencoded to insure that these points also comprise I-frames. It is noted that many sub-streams may be generated and stored and associated with the main content stream.

In one embodiment of the invention, local content is loaded onto a client, such as a set-top terminal or computer, from a local content source such as a video cassette recorder (VCR), digital video recorder (DVR), personal video recorder (PVR), computer or other storage and/or content source. For example, local content may be loaded onto the set top terminal or streamed to the set top terminal from a camera, live video and/or live audio feed. The content loaded onto the set top terminal is transcoded using a transcoding application. If the client does not have an appropriate transcoding application, such transcoding application is downloaded from a server within the system. The transcoding application is used to transcode the loaded content into a desired player format. For example, if the loaded content comprises streaming video and audio at baseband, then such streaming video and audio may be encoded according to any one of the formats previously discussed (e.g., AVI, MPEG, etc.). In the case of the locally loaded content being encoded according to a first format that is not desired, then the content so encoded is transcoded using the transcoding application to produce content in the desired player format. The transcoded local content is then encapsulated in a desired transport format. The desired transport format is a transport format adapted to a particular access network. The particular formats associated with various access networks are described above. The transport encapsulated content is then encapsulated in a realtime protocol packet, such as described above. The RTP packet stream is then uploaded to the server for subsequent distribution to clients (i.e., set-top terminals or computers) utilizing the desired player format via access networks utilizing the desired access network transport format.

In addition to uploading encapsulated data to the server, the client may also provide access right data to the server for subsequent use in determining who may view the content, who may use the content, how long the content may be viewed, how long the content may be used, which geographic region the viewer or user is in, which set or sub-set of clients within a particular system are to have access, which passwords, if any, are to be used and so on.

As an example, in the case of a set-top terminal associated with a user wishing to share video imagery of a new baby, the video imagery and associated audio information may be input to a set-top terminal from the video camera. The set-top terminal then uses a coding or transcoding application to encode the video and audio information according to a desired format, such as the above-mentioned AVI format. Assuming that the subscribers within a system who are to receive this imagery (e.g., friends and neighbors) are within a system having an access network utilizing the MPEG-2 transport format, the set-top terminal or client will then transport encode the AVI encoded content to produce an MPEG-2 transport stream. The MPEG-2 transport stream comprising the AVI encoded content will be further transport encoded according to the realtime protocol techniques described above. The RTP encoded content and associated access information (e.g., passwords for family members and the like) is then uploaded to the server for subsequent distribution on demand to the appropriate viewers or users.

Although various embodiments which incorporate the teachings of the present invention have been shown and described in detail herein, those skilled in the art can readily devise many other varied embodiments that still incorporate these teachings.

What is claimed is:

1. A method for post processing content from a stream caching server in an interactive information distribution system, the method comprising:

receiving, from a subscriber terminal associated with an access network, a request at a head end through a stream distribution network for content stored on a stream caching server at the head end in a preprocessed form in which the content is transcoded according to a first content processing method supported by a first type of viewer and encapsulated according to a transport protocol supported by the stream caching server;

retrieving the requested content from the stream caching server;

transmitting the retrieved content from the stream caching server at the head end to a packet processor at the head end;

determining, at the packet processor, whether the user associated with the requesting subscriber terminal has a multimedia player capable of viewing the retrieved content;

downloading a multimedia player to the requesting subscriber terminal capable of viewing the retrieved content when the user does not have a multimedia player capable of viewing the retrieved content;

identifying a type of multimedia player associated with the requesting subscriber terminal to be used to view the retrieved content;

determining, at the packet processor, whether the retrieved content is configured for viewing by the multimedia player associated with the user of the requesting subscriber terminal and for transmitting the content over the access network of the requesting subscriber;

in response to a determination to transcode the retrieved content, transcoding the retrieved content by the packet processor at the head end from the first content processing method to a second content processing method required by the multimedia player associated with the user of the requesting subscriber terminal, wherein the transcoded content is encapsulated according to the transport protocol supported by the access network of the requesting subscriber; and streaming the encapsulated transcoded content across the stream distribution network and to the access network of the requesting subscriber.

2. The method of claim 1, wherein the transport format supported by the stream caching server comprises an Internet Protocol (IP) format.

3. The method of claim 2, further comprising:

receiving metadata associated with the content, where the metadata comprises indexing information used by the stream caching server in response to a command provided via the subscriber terminal.

4. The method of claim 3, wherein the metadata is encapsulated with the transcoded content in the IP format.

5. The method of claim 2, wherein IP formatted content is retrieved from the stream caching server in response to the request for content from another stream caching server, and provided to the requesting stream caching server.

6. The method of claim 5, wherein the retrieving and streaming are conditioned upon a user of a second subscriber terminal providing a correct password to an http server as configured by a user of said subscriber terminal.

7. The method of claim 1, wherein the access network comprises one of a wide area network, a local area network, a cable network, a carrier network, a satellite network and a wireless terrestrial network.

8. A local head end in an interactive information distribution system supporting a requesting subscriber terminal associated with an access network, the local head end comprising:

a stream caching server for receiving through a stream distribution network, and from a subscriber terminal associated with an access network, a request from a subscriber terminal associated with the access network for content stored on a stream caching server at a head end in a preprocessed form in which the content is transcoded according to a first content processing method supported by a first type of viewer and encapsulated according to a transport protocol supported by the stream caching server, the stream caching server retrieving the requested content, wherein the stream caching server comprises a storage medium for storing the content; and a post processing server, disposed at the local head end, for retrieving the requested content from the stream caching server and determining whether a user associated with the requesting subscriber terminal has a viewer capable of viewing the retrieved content, downloading a viewer capable of viewing the retrieved content if the user does not have a viewer capable of viewing the retrieved content, and determining whether the retrieved content is configured for viewing by the multimedia player associated with the user of the requesting subscriber terminal and for transmitting the content over the access network of the requesting subscriber, the post processing server transcoding the retrieved content from the first content processing method to a content processing method for viewing by the multimedia player associated with the user of the requesting subscriber terminal and encapsulating the retrieved content according to the transport protocol supported by the access network of the requesting subscriber;

wherein the head end streams the encapsulated content post processed by the post processing server across the stream distribution network and to the access network of the requesting subscriber.

9. The local head end of claim 8, wherein the transport format supported by the stream caching server comprises an Internet Protocol (IP) format.

10. The local head end of claim 9, wherein the encapsulated content includes metadata for the content, where the metadata comprises indexing information used by the stream caching server in response to a command provided by a user viewing the content at the requesting subscriber terminal.

11. The local head end of claim 10, wherein the metadata is encapsulated with IP content in IP format.

12. The local head end of claim 10, wherein the command comprises at least one of fast forward (FF), rewind (REW), pause, stop, bookmark, and return to place.

13. The local head end of claim 9, wherein a payload of an IP packet comprises a plurality of MPEG packets.

14. The local head end of claim 13, wherein the plurality of MPEG packets is contained in a payload of a Realtime Transfer Protocol (RTP) packet contained in a payload of an IP packet.

15. The local head end of claim 13, wherein the plurality of MPEG packets comprises a plurality of one of a MPEG-2 packet and a MPEG-4 packet.

16. The local head end of claim 8, wherein the stream caching server communicates with a remote stream caching server for streaming said content to said stream caching server in response to content from the stream caching server.

17. The local head end of claim 9, wherein the streaming of IP formatted content is conditioned upon a user of a second subscriber terminal providing a correct password to an http server, wherein the correct password is configured by a user of the requesting subscriber terminal.

18. The local head end of claim 8, wherein said access network comprises one of a wide area network, a local area network, a cable network, a carrier network, a satellite network, and a terrestrial wireless network.

19. A method for use in a head end of a distributed network, comprising:

receiving through a stream distribution network, and from a subscriber terminal associated with an access network, a request for content stored on a stream caching server at a head end in a preprocessed form in which the content is transcoded according to a first content processing method compatible with a first type of player and encapsulated according to a transport protocol supported by the stream caching server, wherein the request for content is received at the head end, wherein the request for content is associated with a client associated with the access network of the requesting subscriber;

retrieving the requested content from the stream caching server, wherein the requested content is stored at and retrieved from the head end in the pre-processed form;

transmitting the retrieved content from the stream caching server at the head end to a packet processor at the head end;

determining, at the packet processor, whether the retrieved content needs to be transcoded for the access network and the player associated with the requesting subscriber;

in response to a determination to transcode the retrieved content, de-encapsulating the requested content from the transport protocol supported by the stream caching server;

transcoding the requested content at the packet processor from the first player content processing method to a second content processing method supported by at least one of the access network of the requesting subscriber and the player associated with the requesting subscriber;

re-encapsulating the transcoded content into the desired transport protocol; and streaming the encapsulated transcoded content from the head end via the stream distribution network and the access network of the requesting subscriber.

20. The method of claim 19, wherein the step of re-encapsulating comprises:

first encapsulating the transcoded content according to a transport format adapted to the access network; and further encapsulating the transport formatted content within a realtime protocol (RTP) packet adapted to an internet protocol (IP) network.

* * * * *